US011092082B2

(12) United States Patent
Brito et al.

(10) Patent No.: US 11,092,082 B2
(45) Date of Patent: *Aug. 17, 2021

(54) TRANSMISSION FOR ENGINE WITH TWO POWER INPUTS

(71) Applicant: PRATT & WHITNEY CANADA CORP., Longueuil (CA)

(72) Inventors: Roberto Brito, Boucherville (CA); Martin Poulin, Mont Saint-Hilaire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 436 days.

This patent is subject to a terminal disclaimer.

(21) Appl. No.: 16/115,790

(22) Filed: Aug. 29, 2018

(65) Prior Publication Data
US 2020/0072322 A1  Mar. 5, 2020

(51) Int. Cl.
*F02C 7/36* (2006.01)
*F16H 37/06* (2006.01)
*F02C 6/20* (2006.01)

(52) U.S. Cl.
CPC .............. *F02C 7/36* (2013.01); *F02C 6/206* (2013.01); *F16H 37/065* (2013.01); *F05D 2220/323* (2013.01); *F05D 2260/40311* (2013.01)

(58) Field of Classification Search
CPC . F02C 7/36; F05D 2260/40311; F16H 37/065
See application file for complete search history.

(56) References Cited

U.S. PATENT DOCUMENTS

| 4,799,354 | A  | 1/1989 | Midgley |
| 7,698,884 | B2 | 4/2010 | Maguire et al. |
| 7,753,036 | B2 | 7/2010 | Lents et al. |
| 7,775,044 | B2 | 8/2010 | Julien et al. |
| 8,226,522 | B2 | 7/2012 | Lemmers, Jr. |

(Continued)

FOREIGN PATENT DOCUMENTS

| EP | 2407644 | 1/2012 |
| EP | 3321494 | 5/2018 |
| WO | 2015073084 | 5/2015 |

OTHER PUBLICATIONS

European Search Report issued for application No. 19194467.7 dated Nov. 26, 2019.

*Primary Examiner* — Erin D Bishop
(74) *Attorney, Agent, or Firm* — Norton Rose Fulbright Canada LLP

(57) ABSTRACT

An engine includes first and second power inputs, and a power output. A transmission includes an epicyclic gear train engaged with the first power input and selectively engageable with the power output. The gear train has a sun gear centrally disposed and defining a center axis of the gear train, a ring gear, and planet gears mounted to a carrier. The planet gears are rotatable about respective planet gear axes. The planet gears are disposed in meshed engagement with the sun gear and the ring gear. A brake engageable in a first position with one of the sun gear, the carrier, and the ring gear slows a rotation thereof to transfer power from the first power input to the power output. The brake in a second position is disengageable from the sun gear, the carrier or the ring gear to decouple the first power input from the power output.

20 Claims, 3 Drawing Sheets

(56) References Cited

U.S. PATENT DOCUMENTS

| | | |
|---:|---|---|
| 9,352,738 B2 | 5/2016 | Kellerman |
| 2006/0005544 A1 | 1/2006 | Herlihy |
| 2012/0329593 A1 | 12/2012 | Larrabee et al. |
| 2015/0275749 A1 | 10/2015 | Thomassin |
| 2015/0275756 A1 | 10/2015 | Bolduc et al. |
| 2017/0126159 A1 | 5/2017 | Spierling et al. |
| 2018/0149091 A1 | 5/2018 | Howell et al. |
| 2020/0102891 A1* | 4/2020 | Brito .................. F16H 1/32 |

* cited by examiner

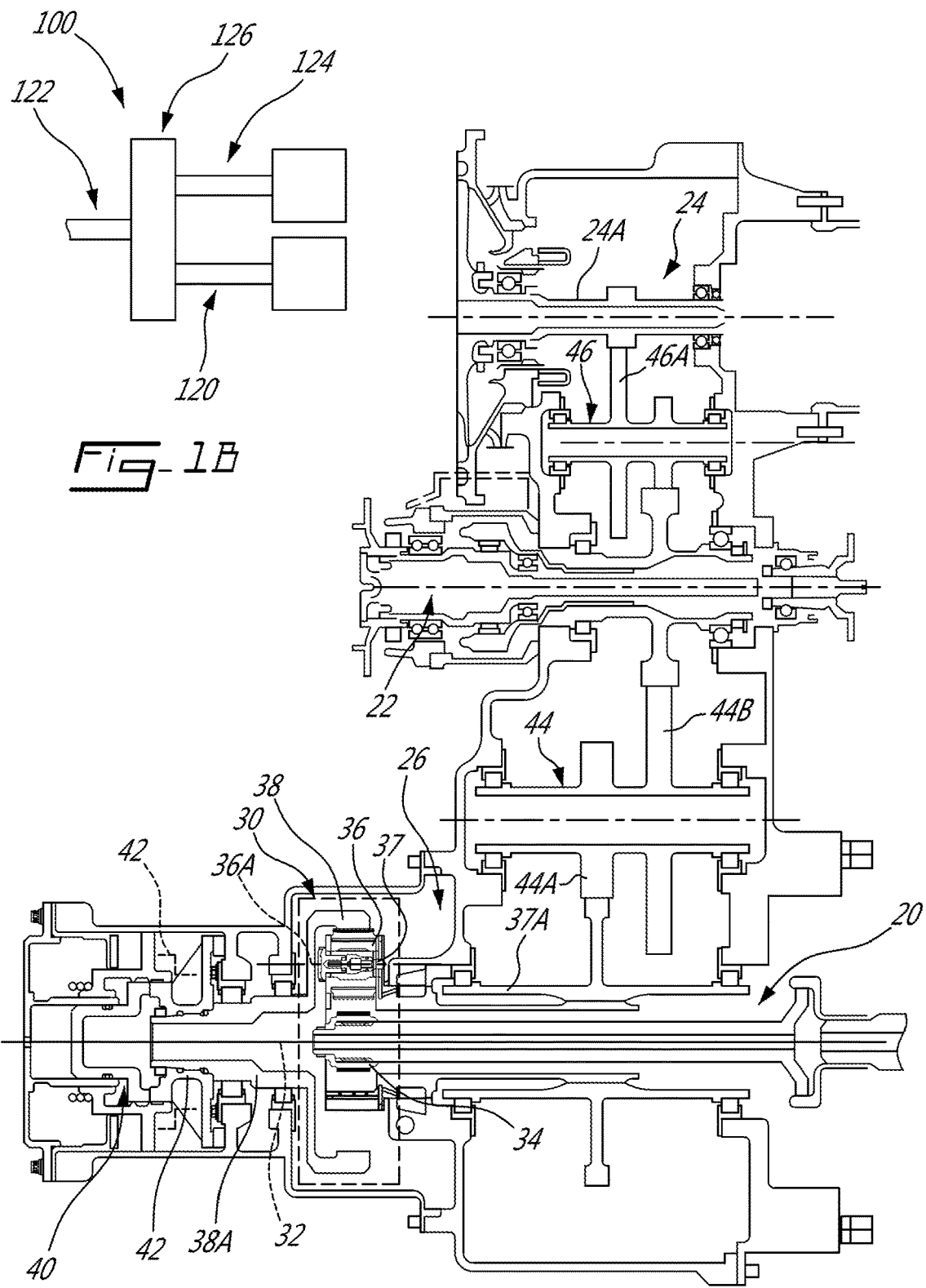

TRANSMISSION FOR ENGINE WITH TWO POWER INPUTS

TECHNICAL FIELD

The application relates generally to engines having multiple power sources, and, more particularly, to a transmission for an engine having two power inputs.

BACKGROUND

It is desirable to be able to disconnect the primary power output of an engine from a driven load, so that the engine can be started and/or stopped without rotating the driven load and thus creating undesirable drag.

Known mechanisms used to connect and disconnect engines and driven loads typically include clutches. Such clutches may for example include friction clutches and clutches using drive straps. These clutches may generate or require considerable friction to operate, both during engagement/disengagement as well as during a normal power transmitting state. This friction causes an undesirable power drain on the primary power output.

SUMMARY

In one aspect, there is provided an engine, comprising: a first power input and a second power input, each associated with a different power source; a power output; and a transmission engaged with the first and second power inputs and with the power output, the transmission including: an epicyclic gear train engaged with the first power input and selectively engageable with the power output, the epicyclic gear train having a sun gear centrally disposed and defining a center axis of the epicyclic gear train, a ring gear, and planet gears mounted to a carrier, the planet gears rotatable about respective planet gear axes, the planet gears disposed in meshed engagement with the sun gear and the ring gear; and a brake engageable in a first position with one of the sun gear, the carrier, and the ring gear to slow a rotation thereof and transfer power from the first power input to the power output, the brake in a second position disengageable from said one of the sun gear, the carrier, and the ring gear to decouple the first power input from the power output such that no power is transmitted from the first power input to the power output.

There is also provided a method of operating an engine having a first power input and a second power input to selectively provide power to a power output, the engine having a transmission with a sun gear, planet gears, and a ring gear, the transmission engaged with the first and second power inputs and with the power output, the method comprising operating a brake of the transmission to engage one of the sun gear, the planet gears, and the ring gear of the transmission to slow a rotation thereof and transfer power from the first power input to the power output; and disengage from said one of the sun gear, the planet gears, and the ring gear to decouple the first power input from the power output such that no power is transmitted from the first power input to the power output.

There is further provided an engine transmission engageable with a first power input of an engine and a second power input, and also engageable with a power output, the engine transmission comprising: a gear train engaged with the first power input and selectively engageable with the power output, the gear train having a sun gear centrally disposed and defining a center axis of the gear train, a ring gear, and planet gears mounted to a carrier, the planet gears rotatable about respective planet gear axes, the planet gears disposed in meshed engagement with the sun gear and the ring gear; and a brake engageable in a first position with one of the sun gear, the carrier, and the ring gear to slow a rotation thereof and transfer power from the first power input to the power output, the brake in a second position disengageable from said one of the sun gear, the carrier, and the ring gear to decouple the first power input from the power output such that no power is transmitted from the first power input to the power output.

BRIEF DESCRIPTION OF THE DRAWINGS

Reference is now made to the accompanying figures in which:

FIG. 1B is a schematic view of an engine, according to an embodiment of the present disclosure;

FIG. 2 is an enlarged view of the portion II-II in FIG. 1, showing a transmission for an engine;

DETAILED DESCRIPTION

Figure 1A:
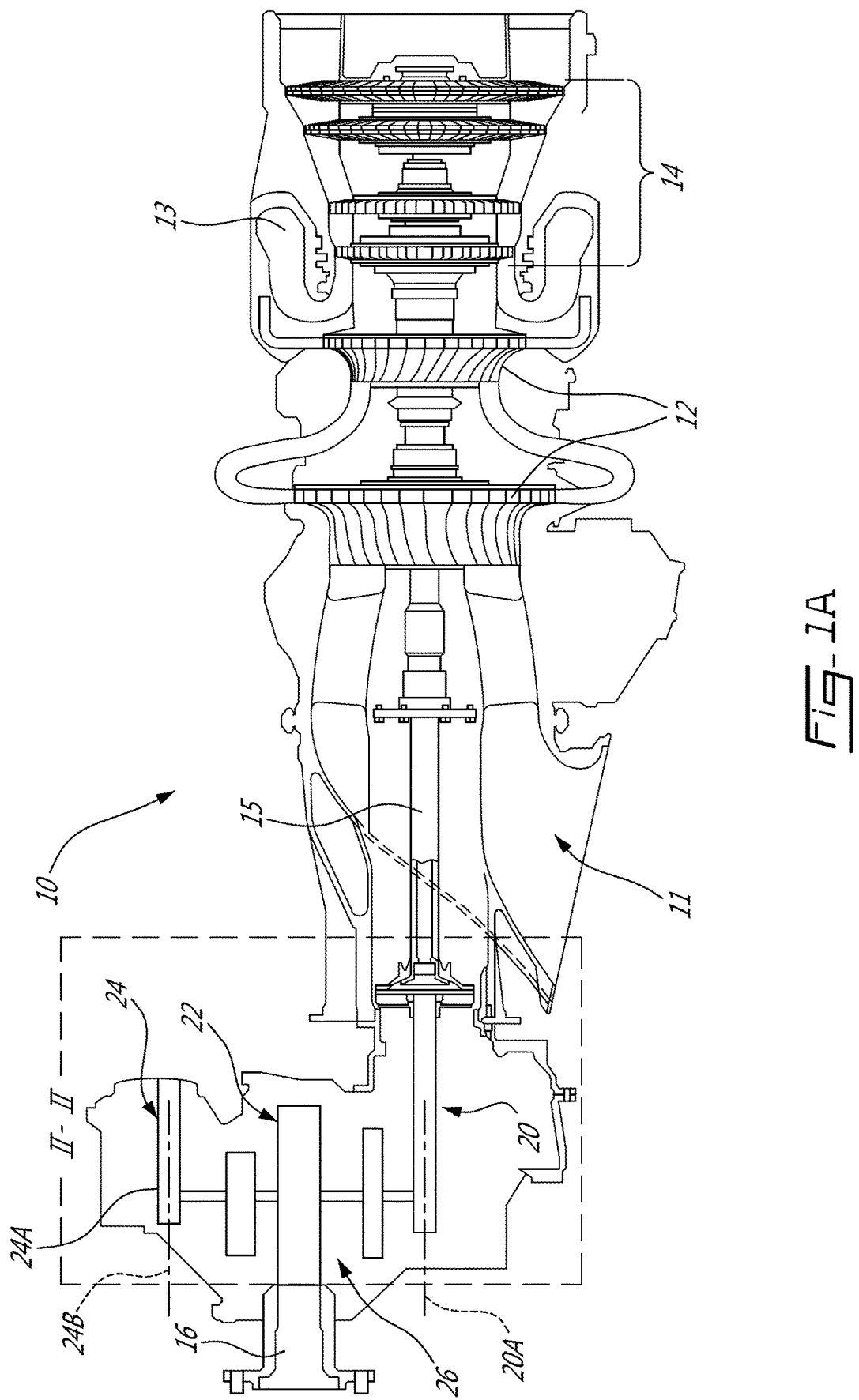
FIG. 1A is a schematic cross-sectional view of a gas turbine engine.

FIG. 1A illustrates a gas turbine engine 10 commonly referred to as a "turboprop", and of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects to transmit a rotatable driving force to a propeller shaft 16. Although the engine 10 shown in FIG. 1A is configured for driving a propeller of an aircraft, the engine 10 in an alternate embodiment is a turboshaft engine configured to drive the rotor of a helicopter. Any suitable engine may be employed.

FIG. 1A also shows schematically an arrangement of components which transmit the rotatable driving force, and thus the power and torque, provided by the power shaft 15 to the propeller shaft 16. The power shaft 15 is coupled to a first power input 20 to transmit power to the first power input 20. The first power input 20 is a source of rotational motive power which indirectly drives the principal load of the engine 10 (e.g. the propeller, the rotor, or their respective reduction gearboxes). In the depicted embodiment, the first power input 20 is embodied as a rotatable shaft coupled to the power shaft 15 to be rotated thereby. In an alternate embodiment, the first power input 20 is embodied as a gearing arrangement which is engaged to, and driven by, the power shaft 15. In another alternate embodiment, the first power input 20 is the power shaft 15.

The first power input 20 indirectly drives a power output 22. The power output 22 is a rotatable output of the engine 10. It is a driven member that functions to drive a rotatable load such as the propeller of an aircraft, the rotor of a helicopter, or the reduction gearboxes associated with the aircraft propeller and helicopter rotor. For example, the power output 22 in the depicted embodiment is, or is coupled to, the propeller shaft 16 to drive the aircraft propeller. In an alternate embodiment, the power output 22 is coupled to rotor of a helicopter via the main helicopter reduction gearbox.

Still referring to FIG. 1A, the engine 10 also has a second power input 24. The second power input 24 is indirectly coupled to the power output 22 to provide power to the power output 22. The second power input 24 is a source of rotational motive power which indirectly drives the principal load of the engine 10 (e.g. the propeller, the rotor, or their respective reduction gearboxes). For example, in the depicted embodiment, the second power input 24 is a starter motor of the hydraulic, electric, or pneumatic type. In an alternate embodiment, the second power input 24 is an auxiliary power unit (APU). In the depicted embodiment, the second power input 24 is embodied as a rotatable shaft 24A that is indirectly coupled to the power output 22, and that is driven by a power source. In an alternate embodiment, the second power input 24 is a gearing arrangement which is engaged to the power output 22, and driven by the power source.

The engine 10 disclosed herein is a "dual-input" engine because it is provided with first and second power inputs 20,24. The first and second power inputs 20,24 are configured to be driven by different power sources. The first and second power inputs 20,24 in the depicted embodiment are separate. By "separate", it is understood that the source of power for the first power input 20 is different from the source of power of the second power input 24. For example, in the depicted embodiment, the source of power of the first power input 20 is the power shaft 15, while the source of power of the second power input 24 is a starter motor. This configuration of different power sources can vary. For example, in another embodiment, the source of power of the first power input 20 is the power shaft 15, while the source of power of the second power input 24 is an APU. In the depicted embodiment, the first and second power inputs 20,24 are also physically separate. The first power input 20 is rotatable about a first power input axis 20A, and the second power input 24 is rotatable about a second power input axis 24B. The first and second power input axes 20A,24B are spaced apart from one another. The first and second power input axes 20A,24B are not collinear.

Still referring to FIG. 1A, the first and second power inputs 20,24 can operate together or separately to drive the power output 22. In the depicted embodiment, the power output 22 is the sole or single source of power for the main load of the engine 10, namely, the propeller, the rotor, or their respective reduction gearboxes. The power output 22 in the depicted embodiment is therefore the only power output to drive the propeller, the rotor, or their respective reduction gearboxes.

The engine 10 has a transmission 26 engaged with the first and second power inputs 20,24 and with the power output 22. The transmission 26 allows for the controlled application of power from the first and second power inputs 20,24 to the power output 22. As will be explained in greater detail below, the transmission 26 includes gears, gear trains, and other gear arrangements to provide speed and torque conversions from the rotating first and second power inputs 20,24.

Although the engine 10 is described herein as a gas turbine engine, the engine 10 may have another configuration. The engine 10 may be an assembly of components including an internal combustion engine. The engine 10 may be a compound cycle engine system, or a compound cycle engine such as described in Lents et al. U.S. Pat. No. 7,753,036, or as described in Julien et al. U.S. Pat. No. 7,775,044, or as described in Thomassin et al. US patent publication No. 2015/0275749, or as described in Bolduc et al. US patent publication No. 2015/0275756, the entire contents of all of which are incorporated by reference herein. The engine 10 may be used as a prime mover engine, such as on an aircraft or other vehicle, or in any other suitable application.

Indeed, FIG. 1B shows another embodiment of the engine 100. The engine 100 is a "dual-input" engine because it is provided with first and second power inputs 120,124. The first and second power inputs 120,124 are configured to be driven by different power sources. The first and second power inputs 120,24 in the depicted embodiment are separate. The first and second power inputs 120,124 can operate together or separately to drive the power output 122. The transmission 126 is engaged with the first and second power inputs 120,124 and with the power output 122. The transmission 126 allows for the controlled application of power from the first and second power inputs 120,124 to the power output 122.

Figure 3:
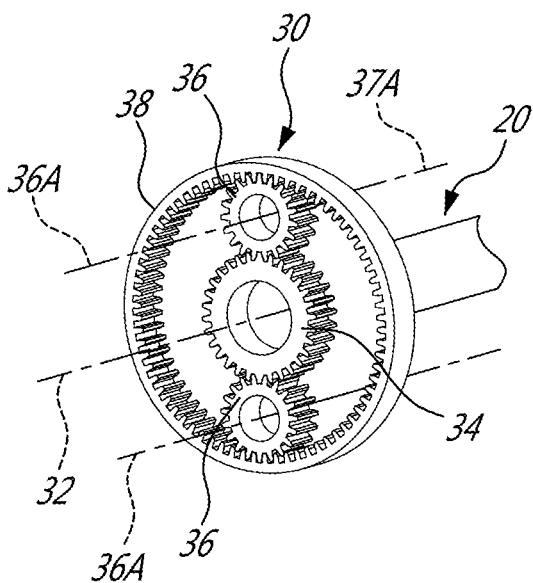
FIG. 3 is a schematic view of a planetary gear train of the transmission shown in FIG. 2.

Referring to FIGS. 2 and 3, the transmission 26 includes an epicyclic gear train 30. The epicyclic gear train 30 may also be referred to herein as a planetary gear train, however it is to be understood that the epicyclic gear train as described herein may also include other types of epicyclic gear trains, including "star" and "solar" gear train configurations.

The epicyclic gear train 30, which in the depicted embodiment is a planetary gear train, is engaged with the first power input 20 to be driven thereby, and is selectively engageable with the power output 22 to drive the power output 22. By "selectively engaged", it is understood that the rotation of components of the planetary gear train 30 is configurable to allow power from the first power input 20 to be transferred to the power output 22, and to prevent power from the first power input 20 being transferred to the power output 22.

The planetary gear train 30 includes a sun gear 34 which, in the depicted embodiment, is engaged with the first power input 20 to be driven thereby about the center axis 32. In alternate embodiments, as described in greater detail below, other components of the planetary gear train 30 are driven by the first power input 20. As shown in FIG. 2, the first power input 20 is coaxial with the sun gear 34. The planetary gear train 30 also has multiple planet gears 36 which mesh with the sun gear 34, and are driven thereby. The planet gears 36 mesh with, and may displace along, the inside of a ring gear 38. The planet gears 36 are therefore disposed between the sun gear 34 and the ring gear 38, and meshed with both of these. The planet gears 36 are mounted to a carrier 37 which extends between and connects the center of the planet gears 36 to displace the planet gears 36 around the sun gear 34. In the depicted embodiment, the carrier 37 is selectively engaged with the power output 22 to drive the power output 22. In alternate embodiments, as described in greater detail below, other components of the planetary gear train 30 are selectively engaged with the power output 22 to drive same. Each planet gear 36 is rotatable about its own planet gear axis 36A. Each planet gear 36 is also rotatable about the center axis 32 to thereby also cause rotation of the carrier 37 about the center axis 32. It will therefore be appreciated that the power provided by the sun gear 34 to the planet gears 36 may cause them to rotate about themselves and their planet gear axes 36A, and may also cause them to rotate about the center axis 32 such that the planet gear axes 36A move with the planet gears 36 about the center axis 32.

Still referring to FIGS. 2 and 3, the ring gear 38 is an outermost gear of the planetary gear train 30. The radially-inner teeth of the ring gear 38 mesh with the teeth of the planet gears 36. As will be explained in greater detail below, the ring gear 38 is rotatable about the center axis 32, and may also be held stationary or in a fixed position. The ring gear 38 is mounted to a support or casing with bearings or other suitable supports.

Referring to FIG. 2, the transmission 26 also includes a brake 40 to engage and disengage a rotating component of the planetary gear train 30. In a first position of the brake 40, and in the embodiment shown in FIG. 2, the brake 40 is engaged with the ring gear 38 to slow its rotation about the center axis 32. Other embodiments are described below in which the brake 40 engages other components of the planetary gear train 30. The brake 40 in the first position may engage the ring gear 38 sufficiently to stop its rotation. The engagement of the brake 40 with the ring gear 38 and the slowing of its rotation about the center axis 32 causes power, and thus torque, to be transferred from the first power input 20 to the power output 22. Power supplied by the first power input 20 to the sun gear 34 is thus transferred to the power output 22 via the components of the planetary gear train 30.

The brake 40 in a second position is disengaged from the ring gear 38. By "disengaged", it is understood that the relationship between the brake 40 with the ring gear 38 is such that the brake 40 does not slow or impede the rotation of the ring gear 38 about the center axis 32. The disengagement of the brake 40 from the ring gear 38 decouples the first power input 20 from the power output 22, such that no power, and thus torque, is transmitted from the first power input 20 to the power output 22. Power supplied by the first power input 20 to the sun gear 34 is thus prevented from being transferred to the power output 22 via the components of the planetary gear train 30.

It will be appreciated that the brake 40, and its engagement with the ring gear 38, can take different forms. For example, in the embodiment shown in FIG. 2, a ring gear shaft 38A extends from the engagement of the ring gear 38 with the planet gears 36 to the brake 40. The ring gear shaft 38A is rotatable with the ring gear 38 about the center axis 32 and is co-axial therewith. The brake 40 includes a brake pad 42 which is displaceable in a direction transverse to the center axis 32 between the first and second positions. In the first position shown in FIG. 2, the brake pad 42 engages the outer surface of the ring gear shaft 38A to slow its rotation. In the second position shown in dotted lines in FIG. 2, the brake pad 42 is spaced radially outwardly from the outer surface of the ring gear shaft 38A and thus does not slow or impede the rotation of the ring gear shaft 38A. The brake 40 in the depicted embodiment is a friction-type brake. In an alternate embodiment, the brake 40 is or includes electric or hydraulic elements. In another alternate embodiment, the brake 40 has locking or meshing features which engage corresponding features of the ring gear 38 or ring gear shaft 38A. It will thus be appreciated that the engagement of the brake 40 with the ring gear 38 may take any suitable form to slow or stop a rotation of the ring gear 38.

The planetary gear train 30 and the brake 40 are therefore operable to allow for coupling and decoupling the first power input 20 to the power output 22. The transmission 26 provides a gearing arrangement for connecting and disconnecting one or more of the first and second power inputs 20,24 with the driven power output 22. This allows for the decoupling of the torque transfer between the first and second power inputs 20,24 and the power output 22, and thus between the first and second power inputs 20,24 and the propeller, the rotor, or their respective reduction gearboxes while reducing friction losses.

Still referring to FIG. 2, when the rotation of the ring gear 38 about the center axis 32 is slowed or held rotationally fixed by the brake 40, the planet gears 36 are caused to rotate within the ring gear 38 about the center axis 32. The rotation of the planet gears 36 causes the carrier 37 to also rotate about the center axis 32. The carrier 37 is engaged with the power output 22 such that rotation of the carrier 37 will rotate and drive the power output 22. Therefore, engagement of the brake 40 with the ring 38 causes rotation of the planet gears 36 by the sun gear 34, and rotation of the carrier 37, to transfer torque from the first power input 20 to the power output 22. In the embodiment where the engine 10 drives the rotor of a helicopter, to initiate main helicopter gearbox rotation, the brake 40 is activated to slow down the ring gear 38. The planet gears 36 are then free to rotate about the center axis 32 to start transmitting torque to the carrier 37, which will then start to turn the shaft of the power output 22. In an embodiment, the brake 40 is externally activated. The externally-activated brake 40 includes an activation mechanism (e.g. a switch) that is external to the transmission 26. The activation mechanism is activated by an input provided by the pilot, the engine 10, and/or the aircraft controller.

The rotating carrier 37 drives other gear components of the transmission 26 disposed between the first power input 20 and the power output 22 to transfer power from the first power input 20 to the power output 22. This arrangement of gear components can take different forms. For example, and as shown in FIG. 2, a carrier shaft 37A extends from the carrier 37 and is coupled thereto, or integral therewith. The carrier shaft 37A is rotated by the carrier 37, and extends parallel to the center axis 32. The carrier shaft 37A extends between the planetary gear train 30 and the power shaft 15 in the depicted embodiment. The carrier shaft 37A is co-axial with the first power input 20, and the rotatable shaft of the first power input 20 shaft is disposed within the carrier shaft 37A in the depicted embodiment.

The carrier shaft 37A engages the power output 22 to drive the power output 22. More particularly, and as shown in FIG. 2, the carrier shaft 37A engages a rotatable first geared shaft 44 of the transmission 26 that is positioned between the carrier shaft 37A and the power output 22. The first geared shaft 44 is also positioned between the second power input 24 and the first power input 20. The first geared shaft 44 has a carrier gear member 44A engaged with the carrier shaft 37A, and a first output gear member 44B engaged with the power output 22. The first geared shaft 44 extends along an axis that is parallel to the center axis 32 in the depicted embodiment. The carrier and first output gear members 44A,44B are spaced apart along the axis of the first geared shaft 44. In the depicted embodiment, each of the carrier and first output gear members 44A,44B are bodies which protrude radially outwardly from the first geared shaft 44 and have gear teeth. The first geared shaft 44 is mounted by suitable bearings to a casing or support structure. The first geared shaft 44 provides speed and torque conversion from the rotating first power input 20 because a diameter of the first output gear member 44B is greater than a diameter of the carrier gear member 44A. In light of the preceding, it will be appreciated that in the first position of the brake 40, power provided by the first power input 20 to the sun gear 34 is transferred to the power output 22 via the planet gears 36, the carrier 37, the carrier shaft 37A, and the first geared shaft 44.

Still referring to FIG. 2, when the brake 40 is in the second position and is disengaged from the ring gear 38 to allow rotation thereof, each planet gear 36 is caused to rotate about its own planet gear axis 36A by the rotating sun gear 34 because the rotation of the sun gear 34 providing torque input to the planetary gear train 30 causes the ring gear 38 to rotate freely, via the planet gears 36. The planet gears 36 therefore spin about themselves rather than along the ring gear 38 and about the center axis 32. The carrier 37 consequently does not rotate about the center axis 32. Since the carrier 37 does not rotate, it does not output torque to the carrier shaft 37A, and thus does not output torque to the first geared shaft 44 and the power output 22. The freewheeling of the ring gear 38 and of the planet gears 36 therefore forms an effective decoupling of the first power input 20 from the power output 22. The transfer of power and torque is decoupled or made impossible when the ring gear 38 is allowed to freewheel by the brake 40.

This effective decoupling allows for the engine 10 to start up (i.e. through rotation of the power shaft 15) without also having to start up the power output 22 and increase drag. The engine 10 may therefore be started without turning the propeller, the rotor, or their respective reduction gearboxes. A small engine starter may therefore be used. This effective decoupling may also allow the engine 10 to be used as an APU in a "hotel mode" of operation whereby it can generate power but not drive the main gearbox of the aircraft.

Still referring to FIG. 2, the second power input 24 may be used to provide a start assist to the engine 10 to overcome the drag or inertia of the propeller, the rotor, or their respective reduction gearboxes. The second power input 24 is engageable with the power output 20 when the brake 40 is in the first position to slow rotation of the ring gear 38. To reduce wear on the brake 40 and to ease initiation of rotation of the power output 20, the second power input 24 may provide additional torque input from the power source. This additional torque will cause, through the components described below, the shaft of the power output 22 to rotate and thus help to reduce some of the inertia effects present in the system.

The rotating shaft 24A of the second power input 24 drives other gear components of the transmission 26 disposed between the second power input 24 and the power output 22 to transfer power from the second power input 24 to the power output 22. This arrangement of gear components can take different forms. For example, and as shown in FIG. 2, a rotatable second geared shaft 46 of the transmission 26 is disposed between the second power input 24 and the power output 22. The second geared shaft 46 is positioned between the second power input 24 and the first power input 20. The second geared shaft 46 is positioned between the second power input 24 and the first geared shaft 44. The second geared shaft 46 has a second power input gear member 46A engaged with the shaft 24A of the second power input 24, and a second output gear member 46B engaged with the power output 22. The second geared shaft 46 extends along an axis that is parallel to the center axis 32 in the depicted embodiment. The second power input and second output gear members 46A,46B are spaced apart along the axis of the second geared shaft 46. In the depicted embodiment, each of the second power input and second output gear members 46A,46B are bodies which protrude radially outwardly from the second geared shaft 46 and have gear teeth. The second geared shaft 46 is mounted by suitable bearings to a casing or support structure. The second geared shaft 46 provides speed and torque conversion from the rotating second power input 24 because a diameter of the second output gear member 46B is less than a diameter of the second power input gear member 46A. The second power input 24 therefore also contributes to driving the power output 22, along with the first power input 20. The power contribution of the second power input 24 may help to start rotating the power output 22 before it is supplied with power from the main first power input 20.

Other configurations of the transmission 26 also allow for coupling and decoupling the first power input 20 to the power output 22. These other configurations of the transmission 26, some of which are described in greater detail below, also allow for decoupling the torque transfer between the first and second power inputs 20,24 and the power output 22, and thus between the first and second power inputs 20,24 and the propeller, the rotor, or their respective reduction gearboxes while reducing friction losses. Therefore, and although sometimes described herein as a "planetary" gear train 30, the gear train 30 may be any type of epicyclic gear train and may also operate differently and thus be referred to using other names. For example, and as explained in greater detail below, the gear train 30 may also operate as a "star" or "solar" gear train. In different configurations of the gear train 30, a different rotating element is braked or rotationally fixed. The term "epicyclic" gear train as used herein is therefore understood to include any such configuration, including but not limited to, planetary, star, or solar type gear train systems.

Figure 4:
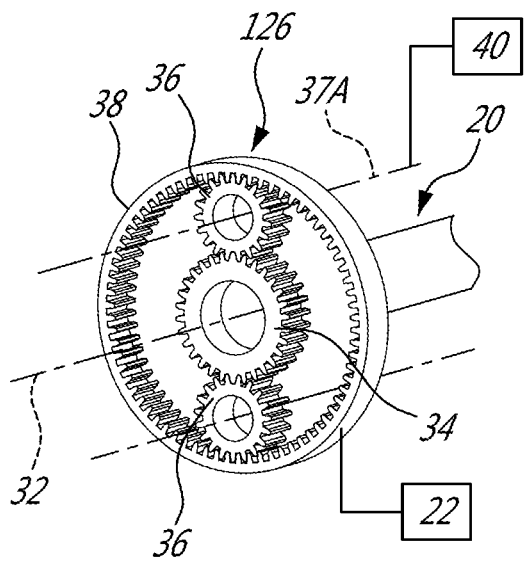
FIG. 4 is a schematic view of a gear train of the transmission, according to another embodiment of the present disclosure.

Another possible configuration for the transmission 126 is shown in FIG. 4. The sun gear 34 is engaged with the first power input 20 to be driven thereby. The brake 40 is selectively engaged with the carrier 37 to slow the rotation of the carrier 37 about the center axis 32. In the depicted embodiment, the brake 40 is engaged with the carrier shaft 37A. By slowing or stopping the rotation of the carrier 37, the ring gear 38 is caused to rotate about the center axis 32. The ring gear 38 in the depicted embodiment engages the power output 22 to drive the power output 22. The ring gear 38 is thus mechanically coupled in any suitable fashion to the gearing arrangement (e.g. the first geared shaft 44) to drive the power output 22. The transmission 126 in the depicted embodiment may therefore be referred to as a "star" gear system, in which the carrier 37 is braked to slow and/or stop rotation thereof, while the planet gears can still rotate about each of their respective axis. The planet gears in such as star gear configuration thus do not revolve around the sun gear (i.e. the axes of rotation of each planet gear is fixed in space), but the planet gears still individually rotate.

Figure 5:
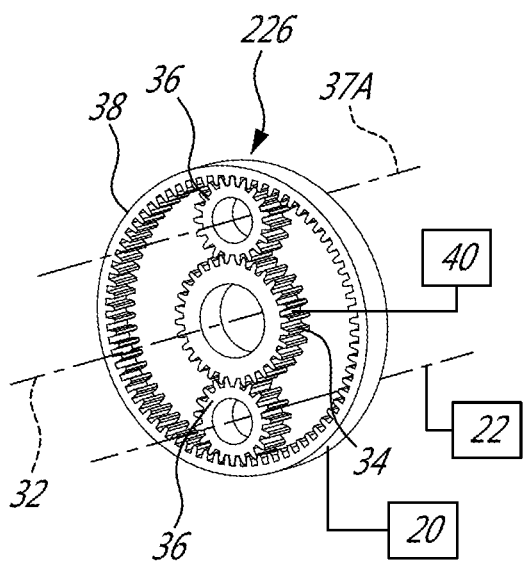
FIG. 5 is a schematic view of a gear train of the transmission, according to yet another embodiment of the present disclosure.

Another possible configuration for the transmission 226 is shown in FIG. 5. The ring gear 38 is engaged with the first power input 20 to be driven thereby. The brake 40 is selectively engaged with the sun gear 34 to slow the rotation of the sun gear 34 about the center axis 32. By slowing or stopping the rotation of the sun gear 34, the planet gears 36 are caused to rotate about the center axis 32 and within the ring gear 38. The rotation of the planet gears 36 also causes the carrier 37 and the carrier shaft 37A to rotate about the center axis 32. The carrier shaft 37A in the depicted embodiment engages the power output 22 to drive the power output 22, as described above. The transmission 226 in the depicted embodiment may therefore be referred to as a "solar" gear system.

Figure 6:
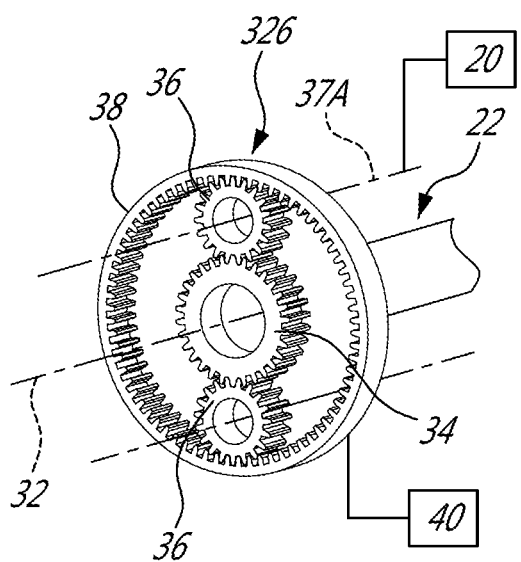
FIG. 6 is a schematic view of a gear train of the transmission, according to another embodiment of the present disclosure.

Another possible configuration for the transmission 326 is shown in FIG. 6. The carrier 37 is engaged with the first power input 20 to be driven thereby. The brake 40 is selectively engaged with the ring gear 38 to slow the rotation of the ring gear 38 about the center axis 32. By slowing or stopping the rotation of the ring gear 38, the sun gear 34 is caused to rotate about the center axis 32. The sun gear 34 in the depicted embodiment engages the power output 22 to drive the power output 22. The sun gear 34 is thus mechanically coupled in any suitable fashion to the gearing arrangement (e.g. the first geared shaft 44) to drive the power output 22. The transmission 326 in the depicted embodiment may therefore be referred to as a "planetary" gear system.

Other configurations for the transmission 26 are also possible. For example, the transmission 26 in an embodiment has a "double planet" configuration. This configuration of the transmission 26 includes a central sun gear 34, a first set of one or more planet gears 36 which orbit the sun gear 34, and the outer ring gear 38. A second set of planet gears 36 is positioned between the first set of planet gears 36 and the outer ring gear 38.

Referring to FIG. 2, there is also disclosed a method of operating the engine 10. The method includes operating the brake 40 of the transmission 26 to engage the ring gear 38 to slow a rotation thereof, and thus transfer power from the first power input 20 to the power output 22. The method also includes operating the brake 40 to disengage from the ring gear 38 to decouple the first power input 20 from the power output 22 such that no power is transmitted from the first power input 20 to the power output 22.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A powerplant for a vehicle, comprising:
a first power input and a second power input, each associated with a different power source;
a power output; and
a transmission engaged with the first and second power inputs and with the power output, the transmission including
an epicyclic gear train engaged with the first power input and selectively engageable with the power output, the epicyclic gear train having a sun gear centrally disposed and defining a center axis of the epicyclic gear train, a ring gear, and planet gears mounted to a carrier, the planet gears rotatable about respective planet gear axes, the planet gears disposed in meshed engagement with the sun gear and the ring gear,
a brake engageable in a first position with one of the sun gear, the carrier, and the ring gear to slow a rotation thereof and transfer power from the first power input to the power output, the brake in a second position disengageable from said one of the sun gear, the carrier, and the ring gear to decouple the first power input from the power output such that no power is transmitted from the first power input to the power output,
a carrier shaft extending from the carrier and rotatable about the center axis, the carrier shaft engaging the power output to drive the power output, and
a first geared shaft disposed between the carrier shaft and the power output, the first geared shaft having a carrier gear member engaged with the carrier shaft and a first output gear member engaged with the power output.

2. The powerplant as defined in claim 1, wherein the brake in the first position is engageable with the ring gear to slow the rotation of the ring gear about the center axis, and to thereby cause the planet gears to rotate within the ring gear and the carrier to rotate about the center axis, the carrier engaging the power output in the first position to drive the power output.

3. The powerplant as defined in claim 1, wherein the brake in the second position is disengageable from the ring gear to allow rotation of the ring gear about the center axis, and to thereby cause each planet gear to rotate about its planet gear axis such that the carrier does not rotate about the center axis.

4. The powerplant as defined in claim 1, wherein a diameter of the first output gear member is greater than a diameter of the carrier gear member.

5. The powerplant as defined in claim 1, wherein the sun gear is engaged with the first power input to be driven thereby, the brake in the first position is engageable with the carrier to slow the rotation of the carrier about the center axis, and to thereby cause the ring gear to rotate about the center axis, the ring gear engaging the power output in the first position to drive the power output.

6. The powerplant as defined in claim 1, wherein the ring gear is engaged with the first power input to be driven thereby, the brake in the first position is engageable with the sun gear to slow the rotation of the sun gear about the center axis, and to thereby cause the planet gears to rotate about the center axis to rotate the carrier, the carrier engaging the power output in the first position to drive the power output.

7. The powerplant as defined in claim 1, wherein the carrier is engaged with the first power input to be driven thereby, the brake in the first position is engageable with the ring gear to slow the rotation of the ring gear about the center axis, and to thereby cause the sun gear to rotate about the center axis, the sun gear engaging the power output in the first position to drive the power output.

8. The powerplant as defined in claim 1, further comprising a propeller or a rotor mounted to the power output, the propeller or the rotor drivable only by power provided by the power output.

9. A powerplant for a vehicle, comprising:
a first power input and a second power input, each associated with a different power source;
a power output; and
a transmission engaged with the first and second power inputs and with the power output, the transmission including
an epicyclic gear train engaged with the first power input and selectively engageable with the power output, the epicyclic gear train having a sun gear centrally disposed and defining a center axis of the epicyclic gear train, a ring gear, and planet gears mounted to a carrier, the planet gears rotatable about respective planet gear axes, the planet gears disposed in meshed engagement with the sun gear and the ring gear,
a brake engageable in a first position with one of the sun gear, the carrier, and the ring gear to slow a rotation thereof and transfer power from the first power input to the power output, the brake in a second position disengageable from said one of the sun gear, the carrier, and the ring gear to decouple the first power input from the power output such that no power is transmitted from the first power input to the power output, the second power input engageable with the power output upon the brake engaging in the first position, and a second geared shaft disposed between the second power input and the power output, the second geared shaft having a second power input gear member engaged with the second power input and a second output gear member engaged with the power output.

10. The powerplant as defined in claim 9, wherein a diameter of the second output gear member is less than a diameter of the second power input gear member.

11. A method of operating a powerplant having a first power input and a second power input to selectively provide power to a power output, the powerplant having an epicyclic transmission with a sun gear, planet gears mounted to a planet carrier, and a ring gear, the transmission engaged with the first and second power inputs and with the power output, the method comprising operating a brake of the transmission to:

engage one of the sun gear, the planet gears, and the ring gear of the transmission to slow a rotation thereof and transfer power from the first power input to the power output via a carrier shaft extending from the planet carrier and rotatable therewith, including using a first geared shaft disposed between the carrier shaft and the power output, the first geared shaft having a carrier gear member engaged with the carrier shaft and a first output gear member engaged with the power output; and disengage from said one of the sun gear, the planet gears, and the ring gear to decouple the first power input from the power output such that no power is transmitted from the first power input to the power output.

12. The method as defined in claim 11, wherein operating the brake to disengage from said one of the sun gear, the planet gears, and the ring gear includes disengaging the brake from the ring gear during start of the powerplant so as to start the powerplant without driving a propeller or a rotor.

13. The method as defined in claim 11, wherein operating the brake to engage said one of the sun gear, the planet gears, and the ring gear includes simultaneously engaging the second power input with the power output.

14. The method as defined in claim 11, wherein operating the brake to engage said one of the sun gear, the planet gears, and the ring gear includes allowing the planet gears to rotate about the center axis, a carrier mounted to the planet gears also rotating about the center axis.

15. The method as defined in claim 11, wherein operating the brake to disengage from said one of the sun gear, the planet gears, and the ring gear includes allowing the ring gear to rotate about the center axis.

16. The method as defined in claim 15, wherein allowing the ring gear to rotate about the center axis includes allowing the planet gears to rotate about an axis of each planet gear, a carrier mounted to the planet gears not rotating about the center axis.

17. An engine transmission engageable with a first power input of an engine and a second power input, and also engageable with a power output, the engine transmission comprising:

an epicyclic gear train engaged with the first power input and selectively engageable with the power output, the epicyclic gear train having a sun gear centrally disposed and defining a center axis of the epicyclic gear train, a ring gear, and planet gears mounted to a carrier, the planet gears rotatable about respective planet gear axes, the planet gears disposed in meshed engagement with the sun gear and the ring gear;

a brake engageable in a first position with one of the sun gear, the carrier, and the ring gear to slow a rotation thereof and transfer power from the first power input to the power output, the brake in a second position disengageable from said one of the sun gear, the carrier, and the ring gear to decouple the first power input from the power output such that no power is transmitted from the first power input to the power output;

a carrier shaft extending from the carrier and rotatable about the center axis, the carrier shaft engaging the power output to drive the power output; and a first geared shaft disposed between the carrier shaft and the power output, the first geared shaft having a carrier gear member engaged with the carrier shaft and a first output gear member engaged with the power output.

18. The engine transmission as defined in claim 17, wherein a diameter of the first output gear member is greater than a diameter of the carrier gear member.

19. The engine transmission as defined in claim 17, wherein the second power input is engageable with the power output upon the brake engaging in the first position, the transmission including a second geared shaft disposed between the second power input and the power output, the second geared shaft having a second power input gear member engaged with the second power input and a second output gear member engaged with the power output.

20. The engine transmission as defined in claim 19, wherein a diameter of the second output gear member is less than a diameter of the second power input gear member.

* * * * *